US006474908B1

(12) United States Patent
Hoag et al.

(10) Patent No.: US 6,474,908 B1
(45) Date of Patent: *Nov. 5, 2002

(54) CHEMICAL OXIDATION OF VOLATILE ORGANIC COMPOUNDS

(75) Inventors: George Edward Hoag, Storrs, CT (US); Pradeep V. Chheda, Storrs, CT (US); Bernard A. Woody, Tolland, CT (US); Gregory M. Dobbs, Glastonbury, CT (US)

(73) Assignees: The University of Connecticut, Storrs, CT (US); United Technologies Corporation, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/674,618

(22) PCT Filed: May 4, 1999

(86) PCT No.: PCT/US99/09742

§ 371 (c)(1),
(2), (4) Date: May 7, 2001

(87) PCT Pub. No.: WO99/56894

PCT Pub. Date: Nov. 11, 1999

Related U.S. Application Data

(63) Continuation-in-part of application No. 09/073,049, filed on May 5, 1998, now Pat. No. 6,019,548.

(51) Int. Cl.[7] .............................. B09B 1/00; B01D 17/06
(52) U.S. Cl. .............................. 405/128.5; 405/128.55; 405/128.75; 405/128.8; 405/263; 588/205; 588/249; 210/747; 210/759; 210/908
(58) Field of Search .............................. 405/52, 128.1, 405/128.15, 128.45, 128.5, 128.55, 128.6, 128.7, 128.75, 128.85, 263, 264; 588/205, 249; 210/747, 758, 759, 766, 908

(56) References Cited

U.S. PATENT DOCUMENTS

| | | |
|---|---|---|
| 4,076,793 A | 2/1978 | Nikolai |
| 4,731,408 A | 3/1988 | Jasne |
| 5,065,822 A | 11/1991 | Miller et al. |
| 5,232,604 A | 8/1993 | Swallow et al. |
| 5,350,522 A | 9/1994 | Fyson |
| 5,430,235 A | 7/1995 | Hooykaas et al. |
| 5,457,269 A | 10/1995 | Schonberg |
| 5,615,974 A | 4/1997 | Land et al. |
| 5,700,107 A | 12/1997 | Newton |
| 5,785,935 A | 7/1998 | Fristad et al. |
| 5,833,388 A | 11/1998 | Edwards et al. |
| 5,849,201 A | 12/1998 | Bradley |

OTHER PUBLICATIONS

Alan T. Stone, et al., "Reduction and Dissolution of Manganese (III) and Manganese (IV) Oxides by Organics", Environ. Sci. Technology (1984), 18, pp. 450–456.

D.A. House, Kinetics and Mechanism of Oxidations by Peroxydisulfate, Victoria University of Wellington, Wellington, New Zealand, Aug. 8, 1961, pp. 185–203.

Goechimica et Cosmochimica Acta, 1975, vol. 39, pp. 505–519, "The interaction of metal ions at the manganese dioxide–solution interface".

Alan T. Stone, et al., "Reduction and Dissolution of Manganese (III) and Manganese (IV) Oxides by Organics", Environ. Sci. Technology, 1984, 18, pp. 617–624.

Philip A. Vella, et al., "Oxidation of Trichloroethylene: A Comparsion of Potassium Permanganate and Fenton's Reagent", Third International Simposium on Chemical Oxidation, Vanderbilt University, Nashville, TN, 13 pages.

E.J. Behrman, et al., "Recent Investigations of the Mechanism of Peroxydisulfate Reactions", Department of Biochemistry The Ohio State University, Columbus, Ohio 43210, pp. 193–218.

I.M. Kolthoff, et al., "The Chemistry of Persulfate. I. The Kinetics and Mechanism of the Decomposition of the Persulfate Ioin in Aqueous Medium", American Chemical Society Journal, vol. 73, Jul. 1951, pp. 3055–3059.

J. Richard Pugh, et al., "Degradation of PCBs and Atrazine by Peroxysulfate Compounds", Tennessee Valley Authority, Environmental Research Center, p. 220.

Hans–Jakob Ulrich, et al., "Oxidation of Chlorphenols adsorbed to Manganese Oxide Surfaces", Environ. Sci. Technol., vol. 23, No. 4, 1989, pp. 421–428.

Shonali Laha, et al., "Oxidation of Aniline and Other Primary Aromatic Amines by Manganese Dioxide", Envirn. Sci. Technol., vol. 24, No. 3, 1990, pp. 363–373.

John E. Van Benschoten, et al., "Kinetic Modeling of Manganese (II) Oxidation by Chlorine Dioxide and Potassium Permanganate", Environ. Sci. Technol., 1992, 26, pp. 1327–1333.

Alan T. Stone, "Reductive Dissolution of Manganese (III/IV) Oxides by Substituted Phenol", Environ. Sci. Technol., 1987, 21, pp. 979–988.

(List continued on next page.)

Primary Examiner—Heather Shackelford
Assistant Examiner—Jong-Suk Lee
(74) Attorney, Agent, or Firm—Cantor Colburn LLP

(57) ABSTRACT

Volatile organic compounds are removed from contaminated soil by introducing one or both of a water soluble peroxygen compound, such as a persulfate, and a permanganate into the soil, either in situ or ex situ, in amounts and under conditions wherein both the soil oxidant demand is satisfied and volatile organic compounds in the soil are oxidized. In a preferred embodiment, when both are used, the peroxygen satisfies the soil oxidant demand and the permanganate oxidizes the volatile organic compounds. Sodium persulfate is the preferred persulfate and potassium permanganate is preferred permanganate. The persulfate and the permanganate may be added to the soil sequentially, or may be mixed together and added as an aqueous solution.

28 Claims, No Drawings

OTHER PUBLICATIONS

Douglas M. MacKay, et al., "Transport of organic contaminants in groundwater", Environ. Sci. Technol., vol. 19, No. 5, 1985, pp. 384–392.

R.M. McKenzie, paper entitiled "The Adsorption of Lead and Other Heavy Metals on Oxides of Manganese and Iron", Aust. J. Soil Res., 1980, 18, pp. 61–73.

William J. Throop, "Alternative Methods of Phenol Wastewater Control", Journal of Hazardous Materials, 1, (1975/77), pp. 319–329.

M. Schnarr, et al., "Laboratory and Controlled field experiments using potassium permanganate to remediate trichloroethylene and perchloroethylene DNAPLs in porous media", Journal of Contaminant Hydrology 29, (1998), pp. 205–224.

CHEMICAL OXIDATION OF VOLATILE ORGANIC COMPOUNDS

CROSS REFERENCE TO RELATED APPLICATIONS

The present application claims the benefit of the filing date under 35 U.S.C. §119 of International Patent Application No. PCT/US99/09742 filed May 4, 1999, which is a continuation-in-part of U.S. Pat. No. 6,019,548 filed May 5, 1998.

TECHNICAL FIELD

The present invention relates to the in situ and ex situ oxidation of organic compounds in soils, groundwater and process water and wastewater and especially relates to the in situ oxidation of volatile organic compounds in soil and groundwater.

BACKGROUND OF THE INVENTION

The presence of volatile organic compounds (VOCs) in subsurface soils and groundwater is a well-documented and extensive problem in industrialized and industrializing countries. As used in this specification and its appended claims, volatile organic compounds or VOCs means any at least slightly water soluble chemical compound of carbon, with a Henry's Law Constant greater than $10^7$ atm m$^3$/mole, which is toxic or carcinogenic, is capable of moving through the soil under the influence of gravity and serving as a source of water contamination by dissolution into water passing through the contaminated soil due to its solubility, including, but not limited to, chlorinated solvents (such as trichloroethylene (TCE), vinyl chloride, tetrachloroethylene (PCE), dichloroethanes, ), benzene,, chlorobenzenes, ethylene dibromide, methyl tertiary butyl ether, halobenzenes, polychlorinated biphenyls, chlorophenols, acetone, ter-butyl alcohol, tert-butyl formate, anilines, nitrobenzenes, toluene, xylenes.

In many cases discharge of volatile organic compounds into the soil have lead to contamination of aquifers resulting in potential public health impacts and degradation of groundwater resources for future use. Treatment and remediation of soils contaminated with volatile organic compounds have been expensive and in many cases incomplete or unsuccessful. Treatment and remediation of volatile organic compounds that are either partially or completely immiscible with water (i.e., Non Aqueous Phase Liquids or NAPLs) have been particularly difficult. This is particularly true if these compounds are not significantly naturally degraded, either chemically or biologically, in soil environments. NAPLs present in the subsurface can be toxic to humans and other organisms and can slowly release dissolved aqueous or gas phase volatile organic compounds to the groundwater resulting in long-term (i.e., decades or longer) sources of chemical contamination of the subsurface. In many cases subsurface groundwater contaminant plumes may extend hundreds to thousands of feet from the source of the chemicals resulting in extensive contamination of the subsurface. These chemicals may then be transported into drinking water sources, lakes, rivers, and even basements of homes.

The U.S. Environmental Protection Agency (USEPA) has established maximum concentration limits for various hazardous compounds. Very low and stringent drinking water limits have been placed on many halogenated organic compounds. For example, the maximum concentration limits for solvents such as trichloroethylene, tetrachloroethylene, and carbon tetrachloride have been established at 5 μg/L, while the maximum concentration limits for chlorobenzenes, polychlorinated biphenyls (PCBs), and ethylene dibromide have been established by the USEPA at 100 μg/L, 0.5 μg/L, and 0.05 μg/L, respectively. Meeting these cleanup criteria is difficult, time consuming, costly, and often virtually impossible using existing technologies.

One technology, which has been attempted at pilot-scale test applications, is the use of potassium permanganate ($KMnO_4$) alone as an oxidant for in situ soil remediation. (Treatment performed in situ does not involve physical removal of the contaminated phase itself, whereas, ex situ treatment methods involve physical removal of the contaminated phase and treatment elsewhere.) This has been attempted in view of $KMnO_4$'s known capacity to oxidize target VOCs present at typical sites (e.g. trichloroethylene, dichloroethylene, and vinyl chloride). An example of such a reaction is: $2MnO_4^- + C_2HCl_3 \Rightarrow 2CO_2 + 2MnO_2 + 3Cl^- + H^+$ It is also well known that $KMnO_4$ has versatile chemistry and high aqueous solubility. Once dissolved into aqueous phase, permanganate salts (such as potassium permanganate, sodium permanganate, calcium permanganate and the like) dissociate to form permanganate ions ($MnO_4^-$) that may transform to a variety of species with oxidation states of manganese in +1, +2, +3, +4, +5, +6, and +7. The most common species of manganese are manganese ions ($Mn^{++}$), manganese dioxide ($MnO_2$), and permanganate ($MnO_4^-$). The oxidation strength of ($MnO_4^-$) depends on the electron accepting capability of ($MnO_4^-$) which is pH dependent. The lower the pH, the greater the tendency of ($MnO_4^-$) to accept the electrons as indicated by the redox potential ($E_0$) values in Eqs. 1 through 4:

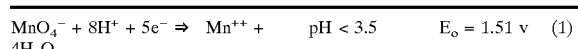
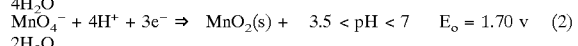
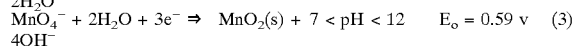

The reactivity of $KMnO_4$ depends on the reaction conditions and the types of organic compounds being oxidized.

While, chemically, potassium permanganate is effective at oxidizing unsaturated volatile organic compounds, currently known methods to use that ability to actually clean up a site require exceedingly large quantities of $KMnO_4$ to overcome the natural oxidant demand exerted by the soil, thereby limiting, for a given amount of $KMnO_4$, the percentage of $KMnO_4$ available for oxidizing the volatile organic compounds. Large amounts of $KMnO_4$ are thus required per unit of soil volume limiting the application of this technology due to high cost.

Another disadvantage of potassium permanganate, which has not been overcome by prior art clean-up methods, is the formation of solid manganese dioxide ($MnO_2$) precipitates. This precipitate may result in clogging of the soil, resulting in a reduced permeability of the soil to water, reducing the hydraulic conductivity thereof, and thereby inhibiting oxidant access to the entire contaminated site rendering treatment of the soil and volatile organic compounds incomplete.

A further disadvantage of adding potassium permanganate alone and in large quantities for subsurface remediation is that it can result in the formation of soluble manganese compounds in groundwater that may exceed drinking water standards. For this and the foregoing reasons, attempts to date to use potassium permanganate for in situ applications have not been fully successful.

Early use of peroxydisulfate is reported for the purpose of organic compound synthesis. Additionally, thermally catalyzed decomposition of ammonium persulfate as a method of organic carbon digestion has been reported being accomplished at very low pH (i.e. in the vicinity of pH 2.0), but has not been thought to be useful for that purpose at higher pH. More recent publications have indicated that, under ambient temperature and uncatalyzed conditions, atrazine and PCBs may be oxidized by ammonium persulfate in aqueous solutions and in contaminant spiked soils under batch conditions. There has been no suggestion that this oxidation reaction has any application to the treatment of volatile organic compounds in contaminated soil or groundwater.

Divalent and heavy metal cation adsorption onto manganese oxide surfaces is a known phenomenon. The order of preference for selected cations to adsorb onto $MnO_2$ surfaces is reported as follows:

$$Pb^{++}>Cu^{++}>Mn^{++}>Co^{++}>Zn^{++}>Ni^{++}>Ba^{++}>Sr^{++}>Ca^{++}>Mg^{++}.$$

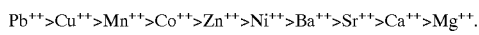

Stoichiometry and rates of redox interactions with manganese dioxide and various organic compounds in aqueous solutions have been studied for some organic compounds, such as aniline and primary aromatic amines; hydroquinone; various organic acids, substituted phenols, and chlorophenols. In all of the above systems reduction of the manganese dioxide to $Mn^{++}$ results in the redox couple with the organic compound being oxidized, the reaction being identified in the literature as interfacial. There has been no recognition, however, that this knowledge has application to the removal of contaminants from soil.

DISCLOSURE OF THE INVENTION

The present invention relates to a method for the treatment of contaminated soil, sediment, clay, rock, and the like (hereinafter inclusively referred to as "soil") containing volatile organic compounds, as well as for treatment of contaminated groundwater or wastewater containing volatile organic compounds.

The method of the present invention uses one or more water soluble oxidants under conditions which enable oxidation of most, and preferably substantially all, the volatile organic compounds in the soil, groundwater, and/or wastewater, rendering them harmless.

The oxidant may be solid phase water soluble peroxygen compound and/or a permanganate compound, introduced into the soil in amounts, under conditions and in a manner which assures that the oxidizing compound(s) are able to both 1) satisfy most and preferably substantially all the soil oxidant demand, and 2) contact and oxidize most, and preferably substantially all, the target VOCs, rendering the target VOCs harmless. As known and used herein, the term "solid phase" refers to the state of a compound in its pure phase at ambient temperatures and pressures. The soil oxidant demand referred to above can be created by various species including natural organic matter, reduced inorganic species such as ferrous ion, ferrous carbonate, and other allochthonous (anthropogenic) organic and reduced inorganic species.

In a preferred embodiment of the invention a peroxygen compound is introduced into the soil in sufficient quantities to satisfy the soil oxidant demand, and a permanganate compound is introduced into the soil in sufficient quantities to oxidize the VOCs and render them harmless. These compounds may be introduced or injected into the soil simultaneously, such as in a mixture, or sequentially. Since the permanganate compound will not have to satisfy the soil oxidant demand to any significant extent, the formation of undesirable amounts of soil clogging $MnO_2$ precipitate, as occurred with prior art methods, is avoided, and the permanganate compound is readily able to reach and react with the target VOCs. This methodology may also be used ex situ to treat quantities of contaminated soil which have been removed from the ground. As used herein and in the appended claims, "sequential" introduction of the peroxygen compound and the permanganate compound is intended to mean introduction or injection of the compounds "one after the other" (i.e. "alternately"), and includes repeating the sequence as many times as necessary to achieve a desired result.

In another embodiment of the present invention, wherein only relatively low levels of VOCs and other organic compounds need to be treated, such as at a distant end of a groundwater plume extending downstream from a contaminated site which has been treated to remove a high percentage of the VOCs and other organic compounds, a permanganate compound alone is introduced into the ground in the path of the contaminated groundwater plume. The permanganate compound creates a zone of material through which the groundwater passes and within which the VOCs and other organic compounds in the groundwater are oxidized. The permanganate compound, when introduced into the soil, will initially react with constituents in the soil to form a "barrier" zone of $MnO_2$ precipitate. The VOCs and other organic compounds in the groundwater readily attach themselves to the $MnO_2$ by adsorption. Reduction of the manganese and oxidation of the VOC then takes place within the zone, resulting in the elimination of the VOCs.

According to another aspect of the present invention, under conditions where metal cations are present in the contaminated soil, persulfate may be introduced into the contaminated soil to remove VOCs. The metal cations catalytically decompose the persulfate to form sulfate free radicals, which oxidize the target VOCs. If the metal cations are not naturally present in sufficient quantities, they may be added from an external source.

The foregoing and other features and advantages of the present invention will become clear from the following description.

BEST MODE FOR CARRYING OUT THE INVENTION

In accordance with an exemplary embodiment of the present invention, the oxidation of volatile organic compounds at a contaminated site is accomplished by the sequential injection of persulfate and then permanganate into the soil.

Alternating injection of the persulfate and permanganate entails introducing sufficient persulfate into the soil to satisfy a sufficient amount of the soil oxidant demand such that, upon the introduction of the permanganate, the permanganate does not excessively react with the normal soil constituents, as it would if used alone. By "excessively" it is meant enough to form $MnO_2$ precipitate in quantities that reduce the soil permeability and diffusivity to the point where the permanganate cannot readily move through the soil to reach and oxidize the VOCs. Due to the lessening of the soil oxidant demand as a result of the persulfate, a faster and more uniform distribution of the permanganate through the soil to the target contaminant is enabled and much less permanganate is required to oxidize the VOCs. However, as the amount of volatile organic compounds decrease, to react with the remaining volatile organic compound the permanganate will need to migrate through additional soil that has an additional soil oxidant demand. This may require an additional injection of persulfate at that location. This sequential injection of persulfate and permanganate would be repeated, as and if required, to oxidize VOCs within the soil volume being treated until the VOC concentration is reduced to the desired level.

In a preferred form of the invention, sodium persulfate ($Na_2S_2O_8$) is introduced into the soil, followed by potassium permanganate ($KMnO_4$). The persulfate satisfies the oxidant demand of the soil by oxidizing the soil constituents, resulting in less of those constituents being available to react with the permanganate. (The persulfate reaction is relatively slow; and it may be desirable, although it is not required, to wait long enough for the persulfate reaction to go to completion before starting the permanganate.) Because less permanganate reacts with the soil, more is available to oxidize the VOCs in the soil. Further, the reduction of ($MnO_4^-$) to the solid precipitate $MnO_2$ is lessened. Thus, there is less precipitate to reduce permeability of the soil and restrict the potassium permanganate from reaching, reacting with and destroying VOCs. In other words, the introduction of both the sodium persulfate and the potassium permanganate into the soil, allows the potassium permanganate to more quickly and more uniformly move through the soil to the target VOCs, rather than forming an unacceptable amount of cementitious-like solid precipitate. (This process may be initiated by the use of injection means, such as wells for in situ application, or by nozzles, pipes or other conduits to inject the oxidants into soil which has been removed from the ground for ex situ treatment.)

For in situ soil treatment, injection rates must be chosen based upon the hydrogeologic conditions, that is, the ability of the oxidizing solution to displace, mix and disperse with existing groundwater and move through the soil. Additionally, injection rates must be sufficient to satisfy the soil oxidant demand and chemical oxidant demand in a realistic time frame. It is advantageous to clean up sites in both a cost effective and timely manner. Careful evaluation of site parameters is crucial. It is well known that soil permeability may change rapidly both as a function of depth and lateral dimension. Therefore, injection well locations are also site specific. Proper application of any remediation technology depends upon knowledge of the subsurface conditions, both chemical and physical, and this process is not different in that respect.

For ex-situ oxidation of VOCs, type of oxidants and their application rates must be determined based on oxidant demand of the contaminated soil or water. Selection of operating conditions (such as extent of mixing, temperature, quantities, and rates of the selected oxidants, duration of treatment and sequencing of oxidant application) are made based on the oxidant demand exerted by the contaminated soil/water and quantity and type of target VOCs to be treated.

Ex-situ treatment systems may include, but are not limited to: (1) above ground tanks, rail cars, trucks, tanks or other commercial transport vessels with or without mixing systems; (2) storage drums; and (3) pipes and other water, soil and soil slurry transfer and conveyance system.

While potassium permanganate is preferred, in view of its lower cost, any compound that dissociates into the desired permanganate ion ($MnO_4^-$) will work. Examples of other possible permanganates useful in the method of the present invention are sodium permanganate and calcium permanganate, in order of increasing cost. At an ambient temperature, the aqueous solubility of $KMnO_4$ is about 60 g/L, while that of $NaMnO_4$ is about 600 g/L. Upon dissolution in water, both dissociate to generate ($MnO_4$)$^-$ ions that undergo various reactions. Although a primary issue is often cost, $NaMnO_4$, due to its order of magnitude greater solubility relative to $KMnO_4$, could be useful whenever the soil permeability is very low and only a small amount of liquid can travel from the injection point toward the contaminant. Additionally, potassium ions have been shown to cause the swelling of certain clays that could lead to permeability reductions. The use of sodium ions, in selected instances, could eliminate such difficulties.

Similarly, while sodium persulfate is the preferred compound for oxidizing the soil constituents, other solid phase water soluble peroxygen compounds comprising a bivalent oxygen group, O—O, can be employed. Such compounds include all the persulfates, and the like, with the persulfates being preferred because they are inexpensive and survive for long periods in the groundwater saturated soil under typical site conditions. The persulfate anion is the most powerful oxidant of the peroxygen family of compounds. Although the persulfate ion is a strong two-electron oxidizing agent with a standard reduction potential of 2.12 v, in the majority of its reactions persulfate undergoes either a one-electron reduction with formation of one sulfate radical ion (and hence has effectively lower reduction potential than 2.12 v) or a breakage of the weak oxygen-oxygen bond with formation of two sulfate radical-ions. The former reaction is represented by the following equation:

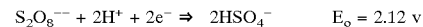

$$S_2O_8^{--} + 2H^+ + 2e^- \Rightarrow 2HSO_4^- \qquad E_o = 2.12 \text{ v}$$

The second reaction generally occurs when solutions of persulfates are sufficiently heated, and is represented by the following equation:

$$S_2O_8^{--} + \text{Heat} \Rightarrow 2SO_4^-$$

Similarly, free radicals can also be generated in the presence of transition metal ions, such as $Fe^{++}$, as follows:

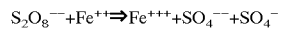

$$S_2O_8^{--} + Fe^{++} \Rightarrow Fe^{+++} + SO_4^{--} + SO_4^-$$

The highly reactive sulfate radical-ion may undergo reactions with a variety of substrates present in the solution. In addition, the one-electron oxidation intermediate of the substrate may be a reactive intermediate, which may further react with other substrates present in the solution or the peroxide ion. Thus, depending on the reaction conditions and type of substrate present, persulfate may follow a direct oxidation pathway, radical formation, or both.

The most preferred persulfate is sodium persulfate as it has the greatest solubility in water and is least expensive. Moreover, it generates sodium and sulfate upon reduction, both of which are relatively benign from environmental and health perspectives. Potassium persulfate and ammonium persulfate are examples of other persulfates which might be used. Potassium persulfate, however, is an order of magnitude less soluble in water than sodium persulfate; and ammonium persulfate is even less desirable as it may decompose into constituents which are potential health concerns.

The following are other examples of reactions of $KMnO_4$, $MnO_4^-$, and $S_2O_8^{--}$ with selected organic and inorganic species:

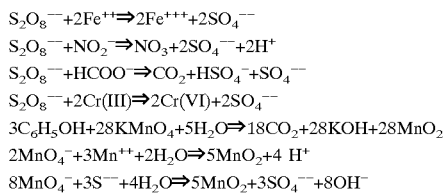

For reasons of economy and purity of the peroxygen compound, it may be advantageous to produce the peroxygen on site near the point of use.

An experiment which demonstrated the successful aqueous phase oxidation of VOCs using potassium permanganate is described in the following example:

EXAMPLE 1

Groundwater contaminated with 21.8 mg/L TCE and 18.1 mg/L cis-1,2-DCE was treated with 500 mg/L $KMnO_4$ solution at an initial pH of 6.95 in a zero head space batch reactor. The concentration of TCE decreased from 21.8 mg/L to 0.01 mg/L in 132 minutes and the concentration of cis-1,2-DCE decreased from 18.1 mg/L to 0.032 mg/L in 26 minutes. The amount of chloride generated as a result of oxidation of TCE and cis-1,2-DCE was 39 mg/L indicating a complete oxidation of these volatile organic compounds.

An experiment which successfully demonstrated in situ oxidation of VOCs in contaminated soil using potassium permanganate is described in the following example:

EXAMPLE 2

A soil core taken from a site contaminated with 103.7 mg TCE/kg of soil and 29.7 mg cis-1,2-DCE/kg of soil was subjected to oxidation using a continuous flow, at 0.3 mL/min, of a 510 mg/L $KMnO_4$ solution. The column was run for 55 h, representing 32.46 pore volumes. After 1.77 pore volumes had passed through the column, cis-1,2-DCE was no longer detectable in the column effluent; after 11.80 pore volumes, TCE was no longer detectable. Elevated $Cl^-$ concentrations were observed in the effluent of the column confirming oxidation of the cis-1,2-DCE and TCE.

An experiment which successfully demonstrated that the soil oxidant demand for $KMnO_4$ is considerably lower with soil sequentially treated with $Na_2S_2O_8$ and $KMnO_4$ than soil treated with $KMnO_4$ alone is described in the following example:

EXAMPLE 3

An experiment was conducted in which an oxidant solution was passed through two different stainless steel columns (43 mm dia×76 mm long) containing uncontaminated, undisturbed soil from a site. In both the cases, the flow rate of oxidant solution was maintained at 0.3 mL/min. In the column A, a solution of 503 mg/L $KMnO_4$ was passed upward through the column for a sufficient length of time so that no further change in concentration of $KMnO_4$ was observed in the effluent. The amount of $KMnO_4$ consumed (or, soil oxidant demand for $KMnO_4$) was 2.71 g $KMnO_4$/kg soil. In the column B, a solution of 961 mg/L $Na_2S_2O_8$ was passed upward through the column for a sufficient length of time so that no further change in concentration of $Na_2S_2O_8$ was observed in the effluent. The amount of $Na_2S_2O_8$ consumed (or, soil oxidant demand for $Na_2S_2O_8$) was 0.26 g $Na_2S_2O_8$/kg soil. After the passage of $Na_2S_2O_8$ solution in Column B, a solution containing 503 mg/L $KMnO_4$ was passed for a sufficient length of time so that no further change in concentration of $KMnO_4$ was observed in the effluent. This time, the amount of $KMnO_4$ consumed (or, soil oxidant demand for $KMnO_4$) was 0.72 g $KMnO_4$/kg soil. Moreover, a much faster breakthrough of $KMnO_4$ was observed in column B (treated with the sequenced oxidation by $Na_2S_2O_8$, and then with $KMnO_4$) than in Column A where the soil was treated with $KMnO_4$ alone.

Two experiments which successfully demonstrated oxidation of MTBE and its by-products are described in the following examples.

EXAMPLE 4

A completely mixed batch experiment was conducted in which 7.85 mg/L MTBE was treated with 6 g/L sodium persulfate in a 100 mL gas tight, zero headspace glass syringe at 30° C., and the content monitored for 72 h. After 28 h, MTBE was no longer detectable. By 72 h, acetone, methyl acetate, t-butyl ester, and 2-methyl-2-propanol by-products identified during the course of the reaction were no longer detectable. Thus, the present experiment resulted in mineralization of MTBE and the by-products of the reaction of MTBE and sodium persulfate in 72 h.

EXAMPLE 5

An experiment was conducted in which 7.37 mg/L MTBE was treated with 5/5 g/L sodium persulfate at 40° C. in the same reaction vessel as Example 4. After 5.5 h, MTBE was no longer detectable. The two by-products identified during the course of the reaction, tert-butyl formate and acetone, were no longer detectable after less than 14 h. Thus, the effect of temperature on the oxidation rate of MTBE and by-products of the reaction of MTBE and sodium persulfate were demonstrated.

The present invention may also be practiced by simultaneously injecting the permanganate and the persulfate into the soil or even by first injecting the permanganate and thereafter injecting the persulfate, in view of the fact that the permanganate reaction front is much more retarded than is the persulfate. If injected together, the permanganate will be used up rather quickly near the point of introduction or injection; and the persulfate front will expand more rapidly than the permanganate due to its slower reaction rate. After injection of the persulfate, the permanganate reaction front will then travel through the soil.

Typically, the oxidation of VOCs is a solubility-limited reaction. The destruction of VOCs occurs in aqueous phase solution. If the oxidant is present in sufficient quantity, it will oxidize the VOCs leading to the depletion of its concentration in the aqueous phase. This will, in turn, lead to dissolution of the pure phase VOCs into the water (since the VOCs are at least partially soluble). Dissolution is driven by solubility and the concentration gradient. Once the VOCs in the aqueous phase are oxidized, its concentration drops, leading to an increased concentration gradient that promotes dissolution of pure phase VOCs into aqueous phase, and the process continues until all the VOCs are destroyed.

For simultaneous injection the chemicals, being compatible with each other, may be mixed together in the same vessel prior to injection. The amounts mixed together are not critical, except it is preferred that enough persulfate is present to satisfy substantially all the soil oxidant demand and enough permanganate is present to destroy the VOCs to acceptable levels, or as close thereto as possible. More specifically, if potassium permanganate is used, the amount of persulfate used should be sufficient to oxidize most of and preferably substantially all the organic and inorganic soil constituents that are reactive with potassium permanganate in order to minimize the amount of potassium permanganate needed, thereby keeping both the generation of $MnO_2$ and cost to a minimum.

Depending upon the type of soil, target VOCs, and other oxidant demand by the site, the concentrations of persulfates likely to be used in the present invention may vary from 250 mg/L to 200,000 mg/L, and, that of permanganate may vary from 250 mg/L to 100,000 mg/L. The preferred concentrations are a function of the soil characteristics, including the site-specific oxidant demands. Hydrogeologic conditions govern the rate of movement of the chemicals through the soil, and those conditions must be considered together with the soil chemistry to understand how best to perform the injection. The techniques for making these determinations and performing the injections are well known in the art. For example, wells could be drilled at various locations in and around the suspected contaminated site to determine, as closely as possible, where the contamination is located. Core samples would be withdrawn, being careful to protect the samples from atmospheric oxidation. The samples would be used to determine soil oxidant demand and chemical (i.e. VOC) oxidant demand existing in the subsurface. The precise chemical compounds in the soil and their concentration would also be determined. Contaminated groundwater would be collected. Oxidants would be added to the collected groundwater during laboratory treatability experiments to determine which compounds are destroyed in the groundwater. It would then be determined whether the same oxidants are able to destroy those chemicals in the soil environment.

One method for calculating the preferred amounts of persulfate and permanganate to be used per unit soil mass (for an identified volume of soil at the site) is to first determine the minimum amount of persulfate needed to fully satisfy soil oxidant demand per unit mass of uncontaminated soil. A contaminated soil sample from the identified volume of soil is then treated with that predetermined (per unit mass) amount of persulfate; and the minimum amount of permanganate required to eliminate the VOCs in that treated sample is then determined. The amount of the permanganate required is a function of the mass of target chemical and its distribution in the subsurface, as well as any unreacted soil oxidant demand. More specifically, it is desired to have sufficient permanganate to fully oxidize all the target compound(s). Permanganate is consumed during the oxidation process. Chemical reaction stoichiometry governs the mass/mass ratios and thus the total amount required to achieve the desired result. It is assumed that the persulfate will react and destroy most of the soil oxidant demand, but there will likely be some low permeability regions in the soil which will have unsatisfied oxidant demand, so excess permanganate would normally be applied to account for this "unreacted" soil oxidant demand. In actuality the amounts of persulfate and permanganate injected into various locations at a single contaminated site will vary depending upon what is learned from the core samples and other techniques for mapping what is believed to be the subsurface conditions.

The goal is for the concentration of persulfate in the injected persulfate solution to be just enough to result in the persulfate reaction front traveling at the same velocity as the groundwater in the saturated zone, or as close as possible thereto. (The saturated soil zone is the zone of soil which lies below the water table and is fully saturated. This is the region in which groundwater exists and flows.) In certain saturated zones where the natural velocity of the groundwater is too slow for the purposes of treatment within a certain timeframe, the velocity of groundwater can be increased by increasing the flow rate of the injected persulfate solution or installation of groundwater extraction wells to direct the flow of the injected persulfate solution. Certain soils to be treated may be in unsaturated zones and the method of persulfate injection may be based on infiltration or trickling of the persulfate solution into the subsurface to provide sufficient contact of the soils with the injected chemicals. Certain soils and conditions will require large amounts of persulfate to destroy soil oxidant demand, while other soils and conditions might not. For example, sandy soils having large grain size might have very little surface area, very little oxidizable compounds and therefore very little soil oxidant demand. On the other hand, silty or clayey soils, which are very fine grained, would have large surface area per unit volume. They are likely to also contain larger amounts of oxidizable compounds and thus have a high soil oxidant demand.

Another exemplary form of the invention is useful for destroying relatively low level, but unacceptable, concentrations of VOCs in groundwater. This involves the use of permanganate alone to be reduced, either naturally by the soil or by other means, to form manganese dioxide that can subsequently form a barrier type interception zone in the soil (e.g., a reactive permeable wall) for the destruction of VOCs present in the groundwater passing through the zone. $MnO_2$ is formed in situ by injecting permanganate into the soil. Permanganate is reduced to $MnO_2$ by reduced inorganic and organic species (both naturally occurring and those as a result of human activities) present in the soil. The VOCs readily attach themselves to the $MnO_2$ by adsorption. Simultaneous reduction of the manganese and oxidation of the VOC (redox) then takes place, thereby destroying the VOC. More specifically, the $MnO_2$ precipitates, under certain conditions, oxidize certain organic compounds such as aniline and primary aromatic amines; hydroquinone; various organic acids; and, substituted phenols and chlorophenols. Oxidation reactions with $MnO_2$ and chlorinated solvents are possible as well.

These reactions of $MnO_2$ and organic compounds can be engineered into oxidation-based in situ remediation systems. Reactive, permeable subsurface trenches, treated with permanganate, may be "built" at appropriate locations; or a series of injection wells where $MnO_2$ is formed by permanganate injections could provide protection from off-site migration of aqueous phase pollutants. In both systems, a reactive barrier zone is created of sufficient length to remove, by oxidation, relatively low but unacceptable concentrations of VOCs in groundwater passing therethrough. Barrier zones of this nature are expected to be particularly effective at the downstream end of a plume of groundwater extending from a treated contaminated soil site, wherein the concentrations of VOCs in the plume are low. By "low concentration" it is meant a concentration low enough such that an injection of oxidant into the plume of VOC contaminated soil and groundwater will not be immediately consumed, and the amount of $MnO_2$ precipitate created does not prevent water flow through the zone. (It is believed such low concentrations will need to be on the order of from five parts per billion to ten parts per million.) This will permit the oxidant to continuously (or at least for a long period of time) intercept and destroy VOCs in the contaminated water as it moves through the zones. More specifically, after the $MnO_2$ zone is established resulting from the injection of $KMnO_4$, the formed $MnO_2$ will react with the VOCs passing through this zone. As the VOCs are oxidized the $MnO_2$ will be reduced. Once the $MnO_2$ is sufficiently depleted from the soil, $KMnO_4$ can be reinjected into the soil to replenish the $MnO_2$ treatment zone. This process can be repeated on a periodic or event driven basis. During the $KMnO_4$ injection, the $KMnO_4$ acts as the oxidizing agent; and when the $MnO_2$ zone is established the $MnO_2$ acts as the oxidizing agent. High concentrations of VOCs cannot be treated in this manner because the oxidant would be consumed too quickly in the process of destroying the target chemical, requiring continual frequent replacement. On the other hand, occasional replacement after reasonable periods of time may be acceptable.

In another embodiment of the present invention a persulfate alone (i.e., without the permanganate), such as, but not limited to, sodium persulfate, may be used to oxidize VOCs where the contaminated soil contains divalent metal cations and has reducing conditions. The reducing conditions must result in the divalent metal cations in the soil remaining in solution in the ground water passing through the soil for a sufficient length of time to enable thermally catalyzed persulfate decomposition. Alternatively, if the temperature of the soil is sufficiently high (up to about 99° C.), or if the soil is heated, preferably up to about 40° C. to about 99 ° C., the persulfate will catalytically (thermal) decompose to form sulfate free radicals; the free radicals will then oxidize the target VOCs. If there are insufficient divalent metal cations occurring naturally in the soil, they may be introduced into the soil. For example, ferrous sulfate may be injected into the soil to add iron cations ($Fe^{++}$). During this process the persulfate may also be used to destroy (i.e. satisfy) some of the soil oxidant demand, as well as oxidize VOCs. Permanganate may also be added, along with or sequentially with the persulfate. The permanganate and the sulfate radicals would both act to oxidize volatile organic compounds in the soil. The amount of each ingredient would be selected based upon conditions, with the goal that between the permanganate and the sulfate radicals, substantially all the volatile organic compounds would be oxidized. This procedure is suitable for either in situ or ex situ soil treatment.

Although the invention has been shown and described with respect to detailed embodiments thereof, it will be understood by those skilled in the art that various changes in form and detail thereof may be made without departing form the spirit and scope of the claimed invention.

We claim:

1. A method for oxidizing volatile organic compounds in soil comprising:
   a. introducing solid phase water soluble persulfate compound to the soil to substantially satisfy a soil oxidant demand;
   b. introducing a permanganate into the soil; and
   c. oxidizing volatile organic compounds in the soil with the permanganate.

2. The method as in claim 1, wherein the persulfate is sodium based, ammonium based, or potassium based, or a combination thereof.

3. The method as in claim 2, wherein the persulfate is sodium persulfate.

4. The method as in claim 1, wherein the permanganate is sodium based, or calcium based, or a combination thereof.

5. The method as in claim 1, wherein the permanganate is introduced in sufficient quantities and under conditions to oxidize substantially all the volatile organic compounds in an identified volume of soil being treated.

6. The method as in claim 1, wherein the persulfate and the permanganate are simultaneously introduced to the soil.

7. The method as in claim 6, wherein the persulfate and permanganate are mixed together prior to being introduced into the soil.

8. The method as in claim 1, wherein the persulfate and the permanganate are sequentially introduced to the soil.

9. The method as in claim 8, wherein the persulfate and the permanganate are repeatedly and alternately introduced to the soil until substantially all the volatile organic compounds in the volume of soil being treated are oxidized.

10. The method as in claim 8, wherein the permanganate is introduced to the soil prior to the introduction of the persulfate in amounts and under conditions that generate and leave behind a quantity of manganese dioxide precipitate in the soil as a barrier zone.

11. The method as in claim 1, wherein the permanganate and the persulfate are introduced to the soil sequentially at predetermined time intervals, alternating between the introduction of the permanganate and the introduction of the persulfate.

12. The method as in claim 1, wherein the volatile organic compounds are trichloroethylene, vinyl chloride, tetrachloroethylene, benzene, chlorobenzenes, ethylene dibromide, methyl tertiary butyl ether, dichloroethenes, halobenzenes, polychlorinated biphenyls, chlorophenols, acetone, tert-butyl alcohol, tert-butyl formate, anilines, nitrobenzenes, toluene, or xylenes, or a combination thereof.

13. The method for oxidizing volatile organic compounds in an identified volume of soil, comprising:
   introducing at least permanganate to the soil in amounts and under conditions sufficient;
   to satisfy substantially all the soil oxidant demand and to oxidize the volatile organic compounds in the soil volume.

14. The method as in claim 13, wherein the identified volume of soil is treated ex situ, and wherein the persulfate oxidizes the volatile organic compounds in the volume of soil, and substantially all organic and inorganic soil constituents reactive with permanganate.

15. The method as in claim 14, wherein the permanganate is potassium based, sodium based, or calcium based, or a combination thereof.

16. The method as in claim 14, wherein the permanganate oxidizes substantially all the volatile organic compounds in the volume of soil.

17. The method as in claim 14, wherein the volatile organic compounds are trichloroethylene, vinyl chloride, tetrachloroethylene, benzene, chlorobenzenes, ethylene dibromide, methyl tertiary butyl ether, dichloroethenes, halobenzenes, polychlorinated biphenyls, chlorophenols, acetone, tert-butyl alcohol, tert-butyl formate, anilines, nitrobenzenes, toluene, or xylenes, or a combination thereof.

18. A method for oxidizing subsurface volatile organic compounds in groundwater, comprising:
   creating one or more zones of material in the path of the groundwater, the zones having sufficient permeability to allow the groundwater to pass through the zones, wherein creating the zones of material includes introducing permanganate into the material to form manganese dioxide precipitate within the material of the zones to react with and oxidize the volatile organic compounds within the groundwater passing through the zones, the manganese dioxide precipitate being formed in sufficient quantity to reduce the quantity of the volatile organic compounds in the groundwater passing through the zones wherein the permanganate is potassium based, sodium based, or calcium based, or a combination thereof.

19. The method as in claim 18, wherein the permanganate is calcium permanganate, or sodium permanganate, or a combination thereof.

20. A method for the in situ oxidizing of volatile organic compounds in a volume of soil by introducing persulfate into the volume of soil, followed by heating the soil to form sulfate free radicals in sufficient quantities to oxidize the volatile organic compounds in the volume of soil.

21. The method as in claim 20, wherein the soil is heated to a temperature of up to about 99° C.

22. The method as in claim 21, further comprising adding divalent metal cations to the volume of soil to catalytically decompose the persulfate.

23. The method as in claim 22, further comprising adding metal cations includes adding metal sulfate to the soil volume.

24. The method as in claim 22, wherein the sulfate free radicals oxidize substantially all the volatile organic compounds in the volume of soil.

25. A method for oxidizing volatile organic compounds in a volume of soil by introducing into the volume of soil an aqueous solution of permanganate and persulfate and heating the soil to form sulfate free radicals, wherein the volatile organic compounds in the soil are oxidized.

26. The method as in claim 25, further comprising treating the volume of soil with the solution of permanganate and persulfate, ex situ.

27. The method as in claim 25, wherein the soil is heated to a temperature of up to about 99° C.

28. The method as in claim 25, wherein the sulfate free radicals oxidize substantially all the volatile organic compounds in the volume of soil.

* * * * *